(12) United States Patent
Bantz et al.

(10) Patent No.: US 7,976,311 B2
(45) Date of Patent: Jul. 12, 2011

(54) AUTOMATIC DETERMINATION OF E-LEARNING OBSOLESCENCE

(75) Inventors: David F. Bantz, Portland, ME (US);
Jarir K. Chaar, Tarrytown, NY (US);
Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2335 days.

(21) Appl. No.: 10/732,112

(22) Filed: Dec. 10, 2003

(65) Prior Publication Data

US 2005/0130114 A1 Jun. 16, 2005

(51) Int. Cl.
*G07B 7/00* (2006.01)
(52) U.S. Cl. ...................................................... 434/219
(58) Field of Classification Search .................. 434/219, 434/322–362, 156–185; 705/7, 5, 10–11; 706/1, 8, 26; 707/10, 104.1, 100; 709/200
See application file for complete search history.

(56) References Cited

U.S. PATENT DOCUMENTS

| | | | | |
|---|---|---|---|---|
| 6,157,808 | A * | 12/2000 | Hollingsworth | 434/350 |
| 6,398,556 | B1 * | 6/2002 | Ho et al. | 434/219 |
| 6,502,113 | B1 | 12/2002 | Crawford et al. | 715/210 |
| 6,820,081 | B1 | 11/2004 | Kawai et al. | 707/7 |
| 2001/0051913 | A1 | 12/2001 | Vashistha et al. | 705/37 |
| 2002/0062242 | A1 * | 5/2002 | Suzuki | 705/10 |
| 2003/0083891 | A1 | 5/2003 | Lang et al. | 705/1 |
| 2003/0200168 | A1 | 10/2003 | Cullen et al. | 705/37 |
| 2004/0241627 | A1 * | 12/2004 | Delfing | 434/219 |

OTHER PUBLICATIONS

Computing Degree Shemes; http:cis.paisley.ac.uk/courses/ug-ccds.html; retrieved on May 25, 2007.*
"The Real Value of Knowledge", Greg Nielson, Mar. 23, 2003, retrieved from http://certcities.com/editorial/columns/story.asp?EditorialsID=138—confirmed available from Apr. 2003.*
Florida Title XVI, section 232.246 (2001).
Florida Department of Education, "DOE Information Data Base Requirements", vol. 1, pp. 22-1 and 22-2.

* cited by examiner

*Primary Examiner* — Xuan M Thai
*Assistant Examiner* — Timothy Musselman
(74) *Attorney, Agent, or Firm* — Ido Tuchman; William J. Stock

(57) ABSTRACT

A method, system, and computer program for managing proficiency information about a degree holder. An active degree in a degree field is issued to a degree holder. The active degree includes a certification that the degree holder has completed at least one degree process, a strength value associated with the certification indicating a proficiency in the degree field, and a strength evaluator configured to adjust the strength value such that the strength value reflects the degree holder's proficiency in the degree field over time.

14 Claims, 5 Drawing Sheets

| Degree Holder | Certification | Strength Value | Degree Field | Minimum Level | Notification Level |
|---|---|---|---|---|---|
| John Smith | Stage 3 | 0.9 | Plumbing | 0.1 | 0.3 |
| Mary Thomas | PHD | 0.5 | Electrical Engineering | 0.2 | 0.3 |
| Frank Lee | BS | 0.7 | Architecture | 0.1 | 0.3 |
| ... | ... | ... | ... | ... | ... |
| Team A | Stage 3 | 0.9 | Plumbing | 0.1 | 0.3 |
| Team A | PhD | 0.5 | Electrical Engineering | 0.2 | 0.3 |
| Team A | BS | 0.7 | Architecture | 0.1 | 0.3 |

*Fig. 2*

AUTOMATIC DETERMINATION OF E-LEARNING OBSOLESCENCE

CROSS-REFERENCE TO RELATED APPLICATIONS

This application is related to co-pending U.S. patent application Ser. No. 10/732,327, filed Dec. 10, 2003 for "KNOWLEDGE MANAGEMENT FOR RECURSIVELY VIRTUALIZED TEAMS", which is commonly owned and is hereby incorporated by reference in its entirety.

FIELD OF THE INVENTION

The present invention generally relates to active degrees, and, more specifically, monitoring a degree holder's proficiency in the degree field over time.

BACKGROUND

In this fast-paced world, information in various fields of knowledge quickly becomes out of date. Thus, a degree or certificate in a number of fields can become less meaningful through time. The notion of recertification in various professional fields is common. For example, the American Board for Occupational Health Nurses, Inc. (ABOHN, http://www.abohn.org/RECERT.htm) was established as an independent nursing specialty certification board in 1972. The purpose of ABOHN is to develop and conduct a program of certification for qualified occupational health nurses. Certification is "a process by which a non-governmental agency or association validates, based on predetermined standards of nursing practice, an individual registered nurse's qualifications, knowledge and practice in a defined functional or clinical area of nursing." (National Specialty Nursing Certifying Organizations, 1987, Statement of Purpose, page 1). ABOHN's certification is a voluntary program designed to: assure the public and recognize those nurses who have met designated eligibility requirements for education, experience, and licensure; and have demonstrated specialized knowledge in occupational health nursing. Initial certification through ABOHN is achieved through a process of meeting eligibility criteria and achieving a passing score on an ABOHN examination. Certification is granted in five-year increments. Recertification is required every five years to assure the public of continued expertise in the specialty area of occupational health nursing. Recertification is achieved through continued practice in the field of occupational health nursing and through demonstrated continuing education. Candidates who are unable to meet the criteria for recertification have their certification status withdrawn. Examination is required to regain certification status after withdrawal, and all eligibility criteria must be met for re-examination. One criterion for recertification is for a nurse to document continuing education related to occupational health earned within the five-year period preceding the application deadline.

SUMMARY OF THE INVENTION

The present invention addresses the above-mentioned limitations of the prior art by introducing the notion of obsolescence into e-learning. In particular, described is a system and method for automatically causing degrees and certifications to have a value that increases, decreases, or expires in a graduated fashion based on a number of criteria, such as an automatic assessment of the degree field or area of expertise and pace of change within a particular field. Using an exponential decay function or other decreasing function, a degree's "strength" may decrease through time. When the strength is below a certain threshold, the degree is considered expired. The rate at which the degree decays can depend dynamically on many ambient factors. The degree-holder may be an individual, group, company, information resource (such as an on-line encyclopedia), or other non-human entity. A degree broker may be used to manage the time-dependent nature of individual degrees and team degrees, and to create new teams based on an analysis of individual degrees. Such brokers may charge a fee based on any of the number of users, number of ambient inputs used to compute degree strength, and number of teams formed.

The invention described herein provides an automated system for providing indications that the material a student has learned has become obsolete. A degree-granting institution can use this information to provide a degree that expires after a time interval, with the time interval determined automatically and dynamically based on analysis of fields covered by the courses taken for degree credit. For example, the system may determine automatically that the field of electronic signal processing is changing rapidly by analyzing the number of papers published in a field, monitoring new breakthroughs, determining that the job market in the field is growing rapidly and by other criteria. If the field changes rapidly, then the course material in that field credited to the degree expires rapidly. Expiration of the degree can be based on the extent to which the courses taken for the degree contain obsolete content. A degree for a major in medieval history might not expire, even if a course in signal processing contributed to that degree, but if the major was signal processing the degree might expire. The policy that a degree-granting institution uses to determine potential degree expiration could depend on many factors. Typically, if the degree was granted with a major in a topic that is changing rapidly, the degree might be deemed to be expire sooner than if the major was in a topic that is not changing rapidly.

Thus, one aspect of the invention is an active degree in at least one degree field issued to a degree holder. The active degree includes a certification that the degree holder has completed at least one degree process. A strength value is associated with the certification and indicates a proficiency in the degree field. A strength evaluator is configured to adjust the strength value such that the strength value reflects the degree holder's proficiency in the degree field over time.

Another aspect of the invention is a system for managing proficiency information about a degree holder. The system includes at least one active degree certifying that the degree holder has completed at least one degree process in a degree field. Moreover, at least one strength value is configured to indicate the degree holder's proficiency in the degree field. A degree broker is utilized to adjust the strength value over time such that the strength value reflects the degree holder's proficiency in the degree field over time.

A further aspect of the invention is a method for managing proficiency information about a degree holder. The method includes a receiving operation to receive a certification from a certifying entity that the degree holder has completed at least one degree process. A recording operation records a strength value associated with the certification. An adjusting operation adjusts the strength value to reflect the degree holder's proficiency in the degree field over time.

Yet another aspect of the invention is a computer program product embodied in a tangible media. The computer program product includes program codes configured to cause the program to receive a certification from a certifying entity that the degree holder has completed at least one degree process, record a strength value associated with the certification, and adjust the strength value to reflect the degree holder's proficiency in the degree field over time.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 2 shows an exemplary degree database, as contemplated by one embodiment of the invention.

DETAILED DESCRIPTION OF THE INVENTION

Figure 1:
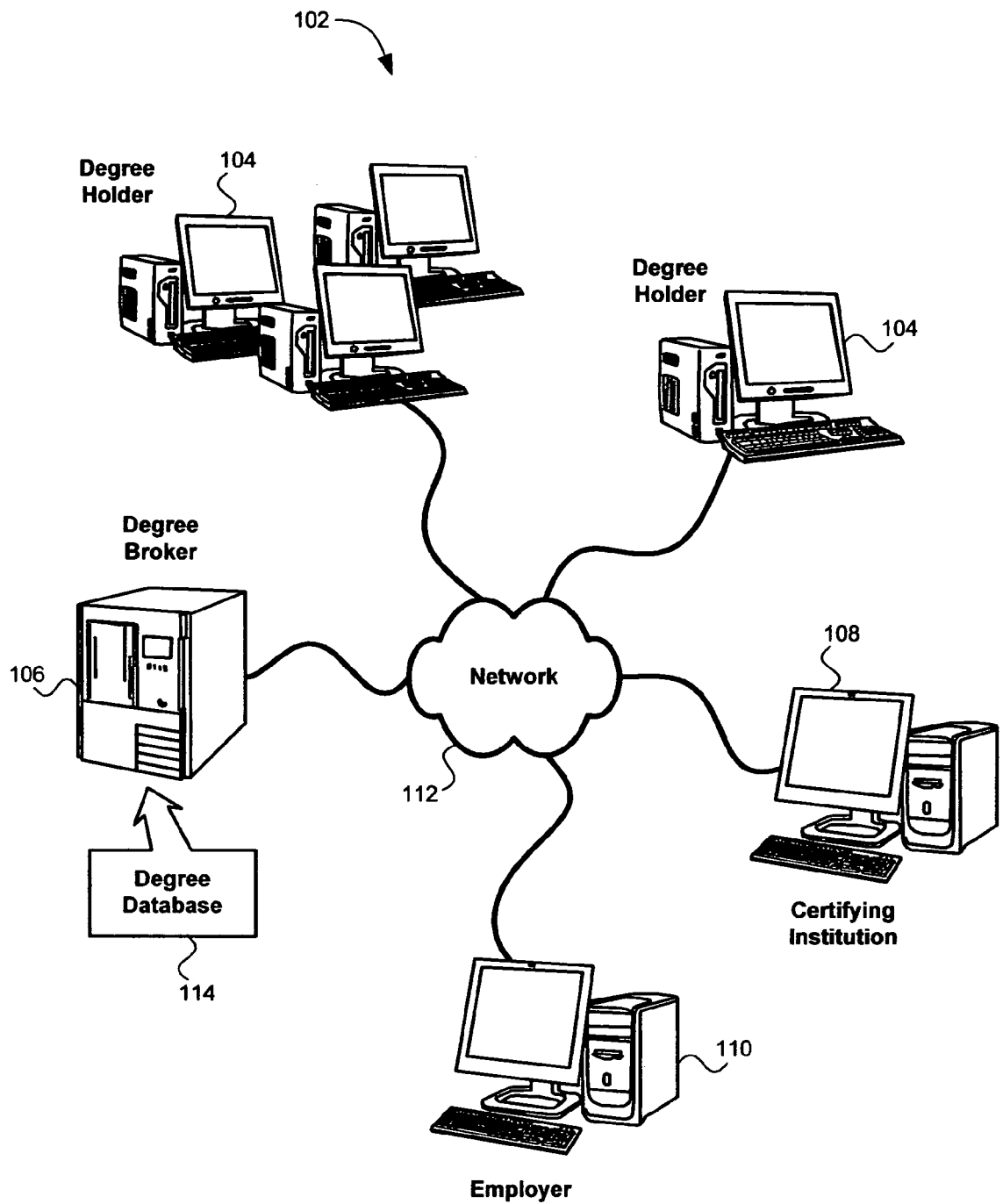
FIG. 1 shows an exemplary environment embodying the present invention.

The following description details how the present invention is employed to maintain and present proficiency information about a degree holder. Throughout the description of the invention reference is made to FIGS. 1-5. When referring to the figures, like structures and elements shown throughout are indicated with like reference numerals.

FIG. 1 shows an exemplary environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein. The environment 102 includes one or more degree holders 104, a degree broker 106, a certifying institution 108, and an employer 110 coupled to a network 112. The network 112 may be any network known in the art for effecting communications between the entities in the environment 102. Thus, the network 112 can be a local area network (LAN), a wide area network (WAN), or a combination thereof. It is contemplated that the network 112 may be configured as a public network, such as the Internet, and/or a private network, and may include various topologies and protocols known in the art.

The certifying institution 108 may be any type of entity that provides a certification process for certifying proficiency in a given field. For example, the certifying institution 108 may be a conventional university offering degree programs to its students. Typically, once a student completes a degree program in a particular academic field, the university certifies that the student is proficient in the academic field. In further embodiments of the invention, the certifying institution 108 may be various testing and education providers known in the art, including, but not limited to, online learning centers, accrediting agencies, and individual educators.

As defined herein, a degree holder 104 includes any individual, team, organization, information resource or other entity that may need confirmation of its proficiency in a field or fields. For example, the degree holder 104 may be a person with a bachelor's degree in computer science from a certifying institution 108. As mentioned above, information in various degree fields can quickly become outdated. It may therefore be important for employers 110 to select degree holders 104 that have current proficiency in their degree field, and for degree holders 104 to demonstrate such up to date proficiency. The present invention addresses these concerns by assigning a strength value to the degree holder's degree. In one embodiment of the invention, the strength value decreases with time and increases with demonstration of proficiency in the degree field. More details about the strength value are given below.

The degree broker 106 is configured to adjust the strength value over time such that the strength value reflects the degree holder's proficiency in the degree field over time. The broker 106 can act as a trusted information source, providing the strength value and degree information to potential employers 110 and other third parties. By doing so, the degree broker 106 can protect those who would employ or obtain services from the degree holder 104. Furthermore, the degree broker 106 can motivate the degree holder 104 to take additional courses or otherwise demonstrate that his or her mastery of a topic is current.

In a typical scenario, the degree broker 106 receives certification from the certifying institution 108 that the degree holder 104 has been awarded a degree or accreditation in at least one degree field. The degree broker 106 may be an employer, school, group of schools, consortium, state, government, or any third party that manages the degrees or teams of individuals with degrees. The degree broker 106 records the degree information, along with an initial degree strength value, in a degree database 114. In one embodiment of the invention, the initial strength value may be set to a maximum strength value. It is contemplated, however, that in other embodiments of the invention the initial strength value may be dependent on various factors such as the degree holder's grades, the certifying institution's ranking, the type of degree awarded to the degree holder 104.

Once the degree information, along with the strength value, is recorded in the degree database 114, the degree broker 106 updates the strength value over time. In a particular embodiment of the invention, the degree broker 106 may decay the strength value according to any decreasing function in a controlled manner. For example, the degree strength may decay exponentially, and the rate of decay may be controlled by a criteria such as an assessment of the pace of change in the field as determined by the number and nature of papers published through time, the number of patents issued in a field, salaries of individuals in a field, number of students in a field, and number of degrees granted through time, and availability of jobs (which may suggest a growth or pace of change in the field).

As an example, consider a nursing degree granted to a degree holder 104 in nursing with an arbitrary initial degree strength of 300. The degree strength may decrease to 50 in one year. The degree strength can be computed after two years as follows: let s be the degree strength at time t. Using the formula for exponential decay, namely $s=s_0 e^{kt}$, where s is the degree strength and $s_0$ is the strength when the degree is initially granted, the strength value can be computed over time. Because a degree strength of 300 "decays" to 50 in one year, we have $50=300e^k$, or $e^k=1/6$. Taking the log of both sides yields a negative value of k. Negative values for k are customary for decay problems. Thus, $\ln e^k=\ln 1/6$, or $k=\ln 1/6$. Thus, $k=-\ln 6$, recalling the identity $\ln(a/b)=\ln(a)-\ln(b)$. To determine the degree strength in two years, t is set to 2 and $s=300e^{2k}=300(e^k)^2=300(1/6)^2$, which gives a degree strength of 8.3.

Thus, the degree strength for the nursing degree gradually decreases, and once it falls below a threshold, it may be regard as expired. During the degree strength diminution, the degree holder 104 may automatically receive information from the degree agent 104 as to how to increase the degree strength so that the degree does not expire. For example, the degree holder 104 may increase the degree strength by attending classes, passing examinations, and working in the degree field. It is therefore contemplated that the degree broker 106 may receive notification from the certifying institution 108 that the degree holder 104 has completed an accreditation program in the degree field, and such notification will act to increase the degree holder's strength value. The degree broker 106 may also receive notification from an employer 110 that the degree holder 104 has completed a duration of employment in the degree field to increase the degree holder's strength value. The strength value of an active degree may therefore improve (as opposed to only decaying over time) based on learning the degree holder 104 gains from formal instruction, work experience, and other factors.

The degree broker 106 may also be used to determine or compose an optimal team of degree holders 104 according to requirements from an employer 110. For example, the degree broker 106 may receive notification from the employer 110 requesting that a team of degree holders 104 be assembled that possesses knowledge in specified degree fields. The employer notification may include other selection factors, such as salary, schedule, experience, service guarantees, geographic locality, language fluency, and the like. The degree broker 106 may automatically create and suggest a virtual team of degree holders 104 with appropriate degrees and strength values. Employers 110 may additionally use the degree broker 106 to evaluate the competency level of their pool of employees and coordinate recruiting efforts.

In FIG. 2, an exemplary degree database 114 is shown in more detail. The degree database 114 includes active degree records 202 for degree holders. Each degree record 202 may comprise a degree holder's identification 204, certification 206, strength value 208, and degree field 210. The degree database 114 can be stored in persistent storage accessible by a computer.

The identification 204 identifies the degree holder and may include such data as the degree holder's name, contact information and authentication passwords and codes. It is noted that the degree holder can be an individual, a group of individuals, agency, company, or non-human agent, such as a knowledge management software system or database, encyclopedia, or manual. If the degree holder is a virtual team of individual team members, the identification 204 may include references to each of the team members, including other virtual teams. If the degree holder is an entity such as an organization or information resource, the identification 204 may include contact information for a person or persons acting on behalf of the degree holder.

The certification 206 contains information about the kind of degree the degree holder possesses. As used herein, a "degree" is defined very broadly to mean any type of certification that requires the degree holder to complete a program, course, examination, or other program. Thus, the certification 206 contains a certification that the degree holder has completed at least one degree process. The certification 206 may include traditional degrees, such as Ph.D., MBA, LLD, or MD, stages of competency, such as "black belt," or simply titles, such as chef, haircutter, or plumber for which there may be different levels of proficiency.

The strength value 208 is configured to indicate the degree holder's level of proficiency in the degree field 210. As discussed earlier, the degree holder's proficiency in the degree field 210 can become stale and decay over time. The strength value 208 is used to reflect the degree holder's continued proficiency over time in the degree field 210. Typically, the strength value 208 is set to a maximum value when certification is obtained by the degree holder and slowly drops down to zero if no additional certification is acquired. For a strength value range of one to zero, the strength value may therefore start at 1.0.

In one embodiment of the invention, a strength evaluator is configured to adjust the strength value 208. The strength evaluator can include a decay function configured to decrease the strength value over time. The strength evaluator may be further configured to decrease the strength value 208 at a decay rate based on one or more ambient inputs. Such ambient inputs include, but are not limited to, the frequency of new patents issued in the degree field 210, the frequency of new publications in the degree field 210, the frequency of changes in the degree field 210, job market growth in the degree field 210, salary levels in the degree field 210, quantity of students in the degree field 210, and the quantity of degrees granted in the degree field 210. The ambient input can also include "Internet occurrence values," such as the number of occurrences of webpages, newstories, newsgroup posts, e-mails, and bulletin-board posts relating to a particular field. For example, the field of "microbiology" may be considered to be growing or fast paced if the word "microbiology" or "*E. coli*" jumps from 10,000 occurrences on the Web to 50,000 occurrences during a period of time. The number of occurrences can be determined using Web search engines and by other means. Moreover, ambient input can include "stock market indicators," such as the number of companies, price of stocks, and related financial information relating to companies. For example, if the number of microbiology companies jumps from 200 to 300, while stock market value of their stock increases, the field of "microbiology" may be considered to be growing or fast paced.

The strength evaluator may also be configured to increase the strength value 208 upon the degree holder's demonstration of proficiency in the degree field 210, completion of an accreditation program in the degree field 210, and/or a duration of employment in the degree field 210. In a particular embodiment of the invention, the strength evaluator may depend on recommendations for a degree holder. For example, if a degree holder secures five exceptional recommendation letters or survey forms (completed by others) relating to his expertise, job skill, or job performance, the strength evaluator may increase.

The degree field 210 indicates the area of training, study or expertise that the degree holder is certified in. These fields may be traditional fields in which a person may get a degree (e.g., medicine, nursing, physics, accounting, law), or they may simply be areas of expertise or interest (e.g., algebra, image processing, history of the 20th century, plumbing). It should be recognized that the degree field 210 affects the rate at which the strength value 208 decays. For example, a degree in the field of electronic signal processing decays more rapidly than a degree in medieval history. The strength evaluator can determine the decay rate of each field automatically by analyzing the ambient factors discussed above, such as papers published and new breakthroughs. Thus, if the degree field 210 changes rapidly, then the strength value 208 drops more rapidly.

As mentioned above, the degree holder 204 may be a team of individuals. Active degree 216 for Team A is an example of an active degree issued to a virtual team composed of three individual degree holders in the database 112. It is contemplated that if any individual member of the virtual team has current knowledge of a relevant topic, the virtual degree of the team is considered to be current with respect to that topic. This is because a team member can be called upon to provide expertise based on current mastery of that topic.

In one embodiment of the invention, a minimum level 212 is recorded in the active degree 202. When the strength value 210 falls below the minimum level 212, the active degree 202 is considered expired. Degree expiration can motivate the degree holder to take additional courses or otherwise demonstrate that his or her mastery of the degree field is current. Furthermore, degree expiration can help protect potential employers from hiring unqualified employees. Employers may also require that their employees maintain their degrees in those specialties that are part of their job responsibilities. Although the active degree may be said to have "expired," it is not required that the degree actually be revoked or terminated. For example, a user may still retain his Ph.D., but prospective employers or team creators now have additional parameters, such as degree strength, to consider when assessing the degree holder.

The database 112 may include software triggers to notify the degree holder, employer, certifying institution or other entities that the degree 202 has expired or is about to expire. For example, the degree broker may send a notification to the degree holder once the strength value 208 falls below a notification level 214 that the strength value 208 is low and is in danger of expiring. The notification may contain suggestions of ways the degree strength 208 can be increased (i.e., by taking a class or paying a fee). For example, the degree holder may have a degree of strength of 0.2 on a scale from 1 to 0. She may then take an on-line test and have the degree strength increased from 0.2 to 0.7 after passing the test.

Figure 3:
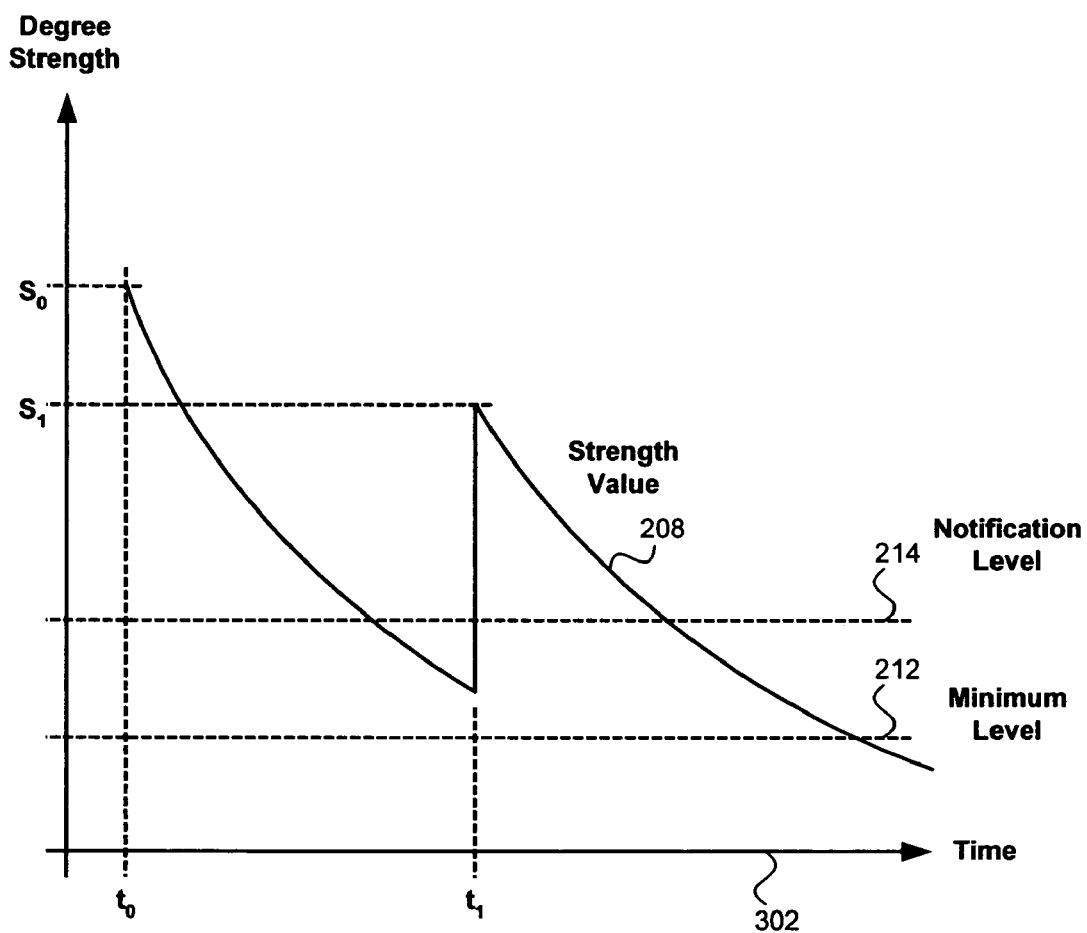
FIG. 3 shows an example of a strength value of an active degree over time.

FIG. 3 shows an example of a strength value 208 of an active degree over time 302. Time $t_0$ symbolizes the time at which the degree holder is awarded the active degree. The strength value at $t_0$ is set to $S_0$, typically a maximum value of the active degree. From time $t_0$ to $t_1$, the strength value 208 decreases slowly. The rate of decrease may be controlled by a decay function dependent on the degree field and at least one ambient condition.

Note that during this time interval, the strength value 208 falls below the notification level 214, causing the degree broker to notify the degree holder, the holder's employer, the holder's certifying institution, and/or other third parties. It is contemplated that the degree holder may also be informed of the degree strength at regular intervals, such as monthly notifications. The degree holder may also be able to inspect the degree strength by, for example, logging in to the degree broker's website and looking up his or her degree strength.

At time $t_1$, the strength value 208 jumps up to $S_1$. This may be the result of the degree holder attending classes in the degree field, passing a recertification test, or completing a duration of experience in the degree field. After time $t_1$, the degree strength 206 again gradually decreases over time 302. Once the degree strength 206 falls below a minimum level 212, the active degree may be considered expired and the degree holder will no longer be identified by the degree broker as having expertise in the degree field.

Figure 4:
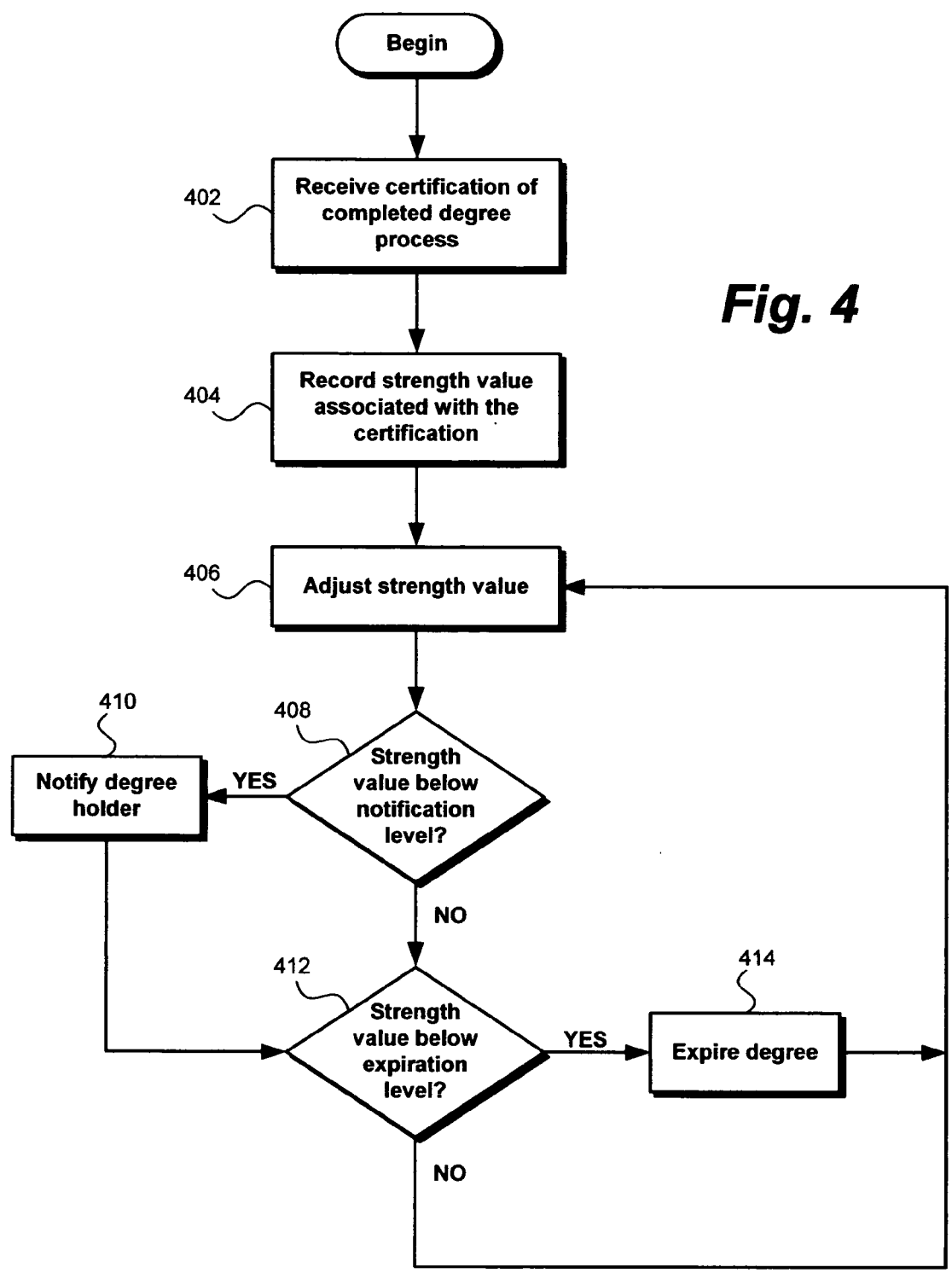
FIG. 4 shows an exemplary flowchart for managing proficiency information about a degree holder.

FIG. 4 shows an exemplary flowchart for managing proficiency information about a degree holder, as contemplated by the present invention. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The flowchart begins at receiving operation 402, where a certification from a certifying entity that the degree holder has completed at least one degree process is received. The notification may be encrypted or otherwise secured so that authenticity of the message can be verified. Such security can help prevent participants from falsely representing themselves as having expertise in areas they are not certified in. The receiving operation 402 may include collecting additional data about the degree holder. For example, the degree broker may create a degree holder profile during the receiving operation 402 and acquire information such as the degree holder's contact information, degree field, employer, and other degrees. After receiving operation 402 is completed, control passes to recording operation 404.

At recording operation 404, a strength value associated with the certification is recorded in the degree holder's database entry. Often, but not always, the active degree is initially granted at a maximum "full strength" value for the strength value. For example, the strength value may start at a maximum value of 1.0. Recording operation 404 may further include recording a minimum level of the strength value below which the degree is considered expired, and a notification level below which the degree holder is informed of the strength value and how to increase the strength value. After recording operation 404 is completed, control flow passes to adjusting operation 406.

At adjusting operation 406, the strength value is adjusted to reflect the degree holder's proficiency in the degree field over time. As mentioned above, this operation may include managing an exponential decay function for the strength value. The function is fashioned by analyzing various ambient conditions indicating the timeliness of the degree holder's training in the degree field. These ambient conditions may include an assessment of the pace of change in the field as determined by the number and nature of papers published through time, salaries of individuals in a field, number of students in a field, and number of degrees granted through time.

Once the ambient conditions are analyzed, the expiration rate and expiration function may be determined. In the previous example, an exponential decay formula, $s=s_0 e^{kt}$ was utilized. Other functions however may used, such a line with negative slope with respect to time on the x-axis. Furthermore, the rate at which the strength value changes may depend on the ambient conditions. For example, if a field is rapidly changing, or for other reasons, the system may increase the rate of change. Consider, for instance, if the number of published papers in the area of microbiology explodes from 50 to 1000 a year, k may change from −1.7 to −1.9. On the other hand, if the number of papers in the field of medieval studies decrease through time, k may change from −1.9 to −1.7. The actual function (e.g. linear or exponential) may change based on an analysis of the field and other ambient factors.

As mentioned above, the adjusting operation 406 may also increase the strength value as a result of the degree holder attending classes in the degree field, passing a recertification test, or completing a duration of experience in the degree field. The degree broker is informed of such increases in the same manner described for receiving operation 402. The amount of strength value increase can be set by the degree broker, certification institution or other entity. After the adjusting operation is completed, control passes to determining operation 408.

At determining operation 408, the strength value is compared to a notification level. If the strength value is below the notification level, control passes to notifying operation 410, where the degree holder is informed that the strength value is currently low. The system may additionally suggest ways with which the degree strength may be increased, such as taking a class in the degree field. After notifying operation 410 is completed, or if the strength value is not below the notification level at determining operation 408, control passes to determining operation 412.

At determining operation 412, the strength value is compared to an expiration level. If the strength value is below the expiration level, control passes to expiring operation 414, where the degree holder is informed that the strength value is recorded as expired. Degree expiration can motivate the degree holder to take additional courses or otherwise demonstrate that his or her mastery of the degree field is current. Furthermore, degree expiration can help protect potential employers from hiring unqualified employees. The expiring operation 414 may include notifying the degree holder that the degree has expired and suggesting ways to increase the degree strength so that the degree may be active again. After expiring operation 414 is completed, or if the strength value is not below the expiration level at determining operation 412, control returns to adjusting operation 406, where the process is repeated.

As mentioned above, an active degree may be granted to a team of people, and it may be the case that the degree is to be evaluated in a manner dependent on the topics of courses credited to the degree. For example, if a prospective employee is to perform duties related to his or her mastery of medieval history, the incipient expiration of his or her degree because of the obsolescence of signal processing course material may not be of interest. In the evaluation of a team of people being considered to perform duties requiring mastery of signal processing, the currency of the knowledge of the team in the topic of signal processing is of interest. For this situation, a degree broker may evaluate the educational background and currency of the team as a whole based on the concept of a "virtual degree." If any individual member of the team has current knowledge of a relevant topic, the virtual degree of the team is considered to be current with respect to that topic. This is because a team member can be called upon to provide expertise based on current mastery of that topic.

Figure 5:
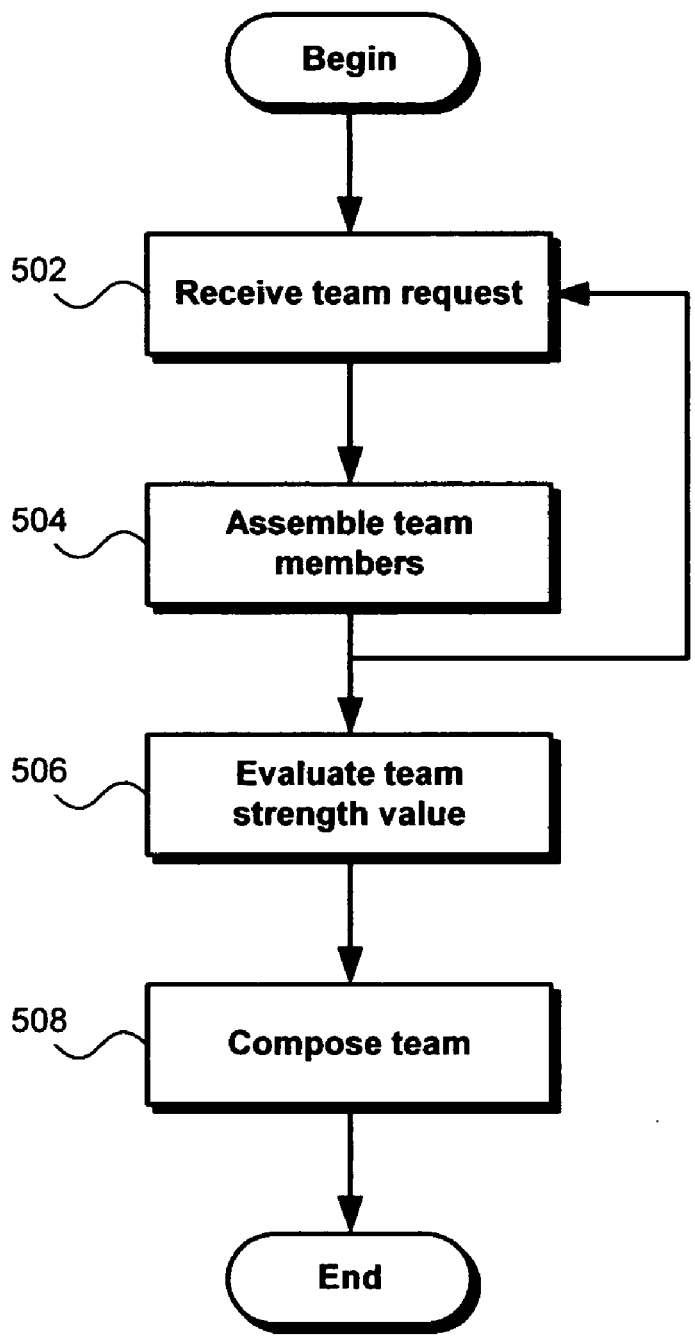
FIG. 5 shows an exemplary flowchart for the construction of a virtual degree, as contemplated by the present invention.

Thus, a degree broker may be used to manage the time-dependent nature of individual degrees and team degrees and to create new teams based on an analysis of individuals' degrees. FIG. 5 shows an exemplary flowchart for the steps of one embodiment for the construction of a virtual degree. Operation flow begins at receiving operation 502, where a request from an employer or other entity is received. The request typically specifies a set of degrees or degree fields that the requester needs to perform a particular task, and, in response, the degree broker identifies topics of relevance to the services to be provided by the team. After receiving operation 502 is completed, control passes to assembling operation 504.

At assembling operation 504, the degree broker examines the degrees of each of the team members and determines if any member has current mastery of a topic. If so, the system marks that topic in the virtual degree as being of current mastery. Current mastery by an individual may depend on the strength value for an individual. For example, a team might have an experienced plumber with a strength value of 0.9 and a chemist with a strength value of 0.5. Operations 502 and 504 may be repeated for each topic of relevance. Once all the team members are assembled, control passes to evaluating operation 506.

At evaluating operation 506, the system evaluates the virtual degree of the team with respect to the topics of relevance. This evaluation may be comparative; that is, evaluating the virtual degree of team 1 against that of team 2 to determine which team has the greater degree of current mastery of all of the topics that are relevant. Each team may have an aggregate strength value based on the relevance of various experts and topics and their individual strength values. After the evaluating operation 506 is completed, control passes to composing operation 508.

At composing operation 508, the individual strength values may be used to actually determine or compose an optimal team. For example, the system may automatically create and suggest a team with the appropriate expertise and degree levels. The cumulative strength and value of a degree for a team may be based on a linear or other combination of that of its constituency (for example, a weighted average). The system may update the strength value as people are added to or leave their teams. For example, the system may improve the strength and value of a decaying degree for a team by hiring new skills so the total value improves. In essence, a virtual degree is a time-sensitive composable entity whose strength depends on the strengths of its members.

A team can have multiple degrees that pertain to a different mix of the skill sets of its members. Similarly, subsets of the team may have sub-degrees, each with a different strength. This enables a company to assemble teams based on an initial value of the virtual degree and the rate at which they would like to improve the value or assume the risk of decaying value for a degree during the course of an engagement.

The degree broker may be used to manage the time-dependent nature of individual degrees and team degrees, and such brokers may charge a fee based on any of: number of users, number of ambient inputs, and number of virtual teams formed. The degree broker may auction, trade, and sell composable teams to potential users. These potential users may pay the degree broker different fees depending on the strength value of the team. For example, the degree broker may charge a fee for composable teams based on the strength value of the team. For instance, a buyer (i.e. potential user) may pay $1000 for a team with S=0.6 and $5000 for a more intellectual team with S=0.8. The broker may also manage the salary of and offer benefits to composable teams. These salaries and benefits may be based on the individual or aggregate strength values.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A computer implemented method for managing proficiency information about a degree holder, the method comprising:
    receiving a certification from a certifying entity that the degree holder has completed at least one degree process;
    recording a strength value associated with the certification in computer storage medium;
    processing the strength value by adjusting the strength value to reflect the degree holder's proficiency in the degree field over time using a computer processor;

expiring the certification if the strength value falls below an expiration level; and wherein adjusting the strength value includes analyzing ambient conditions.

2. The method of claim 1, further comprising providing the strength value to third parties.

3. The method of claim 1, further comprising assembling a virtual team of a plurality of degree holders based on a team request.

4. The method of claim 3, further comprising evaluating a team strength value for the virtual team, wherein the team strength value is based on a combination of team member strength values.

5. The method of claim 3, wherein if any individual member of the team has current knowledge of a relevant topic, the virtual team is considered to be current with respect to that topic.

6. The method of claim 1, further comprising billing a third party based on access by the third party to the proficiency information.

7. The method of claim 1, wherein adjusting the strength value to reflect the degree holder's proficiency in the degree field over time further comprises using a decay function configured to decrease the strength value over time.

8. A computer implemented method for managing proficiency information about a degree holder, the method comprising:

receiving a certification from a certifying entity that the degree holder has completed at least one degree process;

recording a strength value associated with the certification in computer storage medium;

processing the strength value to reflect the degree holder's proficiency in the degree field over time using a computer processor; and expiring the certification if the strength value falls below an expiration level.

9. The method of claim 8, further comprising providing the strength value to third parties.

10. The method of claim 8, further comprising assembling a virtual team of a plurality of degree holders based on a team request.

11. The method of claim 10, further comprising evaluating a team strength value for the virtual team, wherein the team strength value is based on a combination of team member strength values.

12. The method of claim 10, wherein if any individual member of the team has current knowledge of a relevant topic, the virtual team is considered to be current with respect to that topic.

13. The method of claim 8, further comprising billing a third party based on access by the third party to the proficiency information.

14. The method of claim 8, wherein adjusting the strength value to reflect the degree holder's proficiency in the degree field over time further comprises using a decay function configured to decrease the strength value over time.

* * * * *